(12) United States Patent
Dietrich, Jr.

(10) Patent No.: US 11,987,415 B2
(45) Date of Patent: May 21, 2024

(54) METHOD AND APPARATUS FOR FILLING AND/OR EMPTYING FLEXIBLE CONTAINERS

(71) Applicant: FYDEC HOLDING SA, Ecublens (CH)

(72) Inventor: Frédéric Dietrich, Jr., Morrens (CH)

(73) Assignee: FYDEC HOLDING SA, Ecublens (CH)

( * ) Notice: Subject to any disclaimer, the term of this patent is extended or adjusted under 35 U.S.C. 154(b) by 249 days.

(21) Appl. No.: 17/599,000

(22) PCT Filed: Mar. 12, 2020

(86) PCT No.: PCT/EP2020/056711
§ 371 (c)(1),
(2) Date: Sep. 28, 2021

(87) PCT Pub. No.: WO2020/207698
PCT Pub. Date: Oct. 15, 2020

(65) Prior Publication Data
US 2022/0177177 A1 Jun. 9, 2022

(30) Foreign Application Priority Data
Apr. 8, 2019 (EP) ..................... 19167848

(51) Int. Cl.
*B65B 69/00* (2006.01)
*B65G 69/18* (2006.01)

(52) U.S. Cl.
CPC ........ *B65B 69/0075* (2013.01); *B65G 69/183* (2013.01)

(58) Field of Classification Search
CPC ............ B65B 69/0075; B65B 69/0083; B65B 39/007; B65G 69/183
See application file for complete search history.

(56) References Cited

U.S. PATENT DOCUMENTS 4,182,386 A * 1/1980 Alack .................. B65G 69/182
141/93
4,825,913 A * 5/1989 Stott ....................... B65B 39/04
141/93
(Continued)

FOREIGN PATENT DOCUMENTS

CH 708545 A1 3/2015
CN 101500895 A 8/2009
(Continued)

OTHER PUBLICATIONS

International search report for patent application No. PCT/EP2020/056711 dated Jul. 3, 2020.

*Primary Examiner* — Timothy L Maust
(74) *Attorney, Agent, or Firm* — Bachman & LaPointe, P.C.

(57) ABSTRACT

A filling and/or emptying apparatus (I) for filling and/or emptying flexible containers (5) having a filling and/or emptying neck (2) with an open end portion and at least one deformable disposable fastening ring (9), wherein the ring (9) is designed in relation to the internal diameter of the neck (2) such that once a container edge (7) is folded over around the ring, it is possible to insert the ring (9) in an end portion of the neck (2) so that the ring (9) is arranged substantially concentrically with the neck (2), and a radially outer fold-over portion (8) of the container edge (7) is arranged and/or clamped between an inner surface of the neck (2) and a radially outer surface. It is possible to press the ring (9) into a sealing portion (15) of the neck (2), which is arranged after the end portion in the axial direction (A) and has a smaller internal diameter than the end portion. The ring (9) undergoes deformation in the radial direction, so that the insertion and/or pressing into the interior of the neck (2) leads to a radial deformation and a counterposed pressure force which presses the outer fold-over portion (8) of the container edge (Continued)

(7) against the inner surface of the neck (2), thereby sealing the container (5) against the neck (2).

20 Claims, 3 Drawing Sheets

(56) References Cited

U.S. PATENT DOCUMENTS

| | | | | |
|---|---|---|---|---|
| 4,872,493 | A * | 10/1989 | Everman | B65B 39/04 |
| | | | | 141/73 |
| 4,991,633 | A * | 2/1991 | Wong | B65B 31/00 |
| | | | | 141/10 |
| 5,582,219 | A * | 12/1996 | Claar | B65B 1/28 |
| | | | | 141/93 |
| 7,168,460 | B2 * | 1/2007 | Dietrich | B65B 1/16 |
| | | | | 414/217 |
| 7,243,478 | B2 * | 7/2007 | Dawson | B65B 3/14 |
| | | | | 141/10 |
| 7,634,896 | B2 * | 12/2009 | Multer | B65B 69/0008 |
| | | | | 53/469 |
| 10,167,102 | B2 * | 1/2019 | Rubitschung | B65B 69/0075 |
| 10,800,567 | B2 * | 10/2020 | Rubitschung | B65B 69/0075 |
| 2008/0145198 | A1 * | 6/2008 | Multer | B65B 69/0008 |
| | | | | 414/292 |

FOREIGN PATENT DOCUMENTS

| | | |
|---|---|---|
| CN | 101503117 A | 8/2009 |
| CN | 103569685 A | 2/2014 |
| CN | 203652807 U | 6/2014 |
| CN | 104326274 A | 2/2015 |
| CN | 104443605 A | 3/2015 |
| CN | 109476392 A | 3/2019 |
| DE | 20105740 U1 | 6/2001 |
| DE | 102005014996 A1 | 10/2006 |
| DE | 102017212510 A1 | 1/2019 |
| EP | 0835829 A1 | 4/1998 |
| EP | 1502860 A1 | 2/2005 |
| EP | 3444210 A1 | 2/2019 |
| JP | 09-193993 A | 7/1997 |
| RU | 2126357 C1 | 2/1999 |
| WO | 2010134102 A1 | 11/2010 |

* cited by examiner

METHOD AND APPARATUS FOR FILLING AND/OR EMPTYING FLEXIBLE CONTAINERS

BACKGROUND OF THE INVENTION

The present invention relates to a method for filling and/or emptying flexible containers, in particular bags, of, in particular hazardous, loose substances, preferably in powder form. Furthermore, the present invention relates to a filling and/or emptying device for filling and/or emptying flexible containers, in particular bags, of, in particular hazardous, loose substances, preferably in powder form.

The filling and the emptying of flexible containers, such as bags, big bags or other flexible containers with or of loose substances, in particular hazardous loose substances, is inevitable in various sectors of the industrial handling of materials and substances. In this context, the transfer processes in the form of the emptying or filling are typically necessary in order to complete a processing or treatment process and therefore to package and to split a method product into portions for further use, in particular for transport. Likewise, the corresponding transfer processes, for example if flexible containers are emptied, are typically required in order to supply the substances stored or contained in the containers to a production method or to another treatment process.

The loose substances can be substances which are hazardous to health and/or toxic, for example. Likewise, the loose substances can be dangerous in that they can form an explosive mixture at a certain concentration in the ambient air. For reasons of occupational safety and security, the industries which deal with such substances or materials or which handle said substances or materials have developed individual or common standards which specify the amount of substance or material which may be released in the course of the filling of a container or in the course of an emptying of a container, i.e., in particular, the amount which may be released into the ambient air. In said standards, limit values are typically set which depend on the respective toxicity or hazard associated with the substance. Here, one generally speaks of so-called OELs (Occupational Exposure Limits) or OEBs (Operational Exposure Bands). Said limit values define how many micrograms of the substance in question may be measured or detected per cubic meter of ambient air in an environment of a filling device or an emptying device. For example, for materials or substances which are assigned to a class 4 OEB, 1 µm to 10 µm of the substance in question per cubic meter of ambient air are set as the limit value. Accordingly, for a substance which has a class 5 OEB, only 0.1 µm to 1 µm of substance per cubic meter of ambient air may be found.

The very nature of the handled substances and the requirements applying to the occupational safety and to the production safety therefore require that the filling and the emptying of flexible containers of such substances are designed in such a manner that the required containment is achieved and that the required limit values are not exceeded. Thus, it must be ensured during the filling and during the emptying of the containers that the loose substances are filled into the containers or removed from the containers; at the same time, however, it must be ensured that the amount of released material or released substance does not exceed the required limit values.

To this end, various approaches are already known from the state of the art. For example, patent application DE 10 2017 212 510 A1 discloses a connection device for connecting a tubular film to a device which, however, has a relatively complex mechanism. Patent application CH 708 545 A1 also already discloses a method for transferring process material between a container and a reservoir and a corresponding device for this purpose; this device has a simpler mechanism, but nevertheless comprises a plurality of method steps. Consequently, the device and method from the state of the art are also prone to error as a result of either the complex mechanism or the complex method. Additionally, the acquisition, the operation and the maintenance of such devices require a great effort. Moreover, the cleaning of the known devices is difficult or requires a great effort.

Furthermore, devices and methods which operate using inflatable seals are already known from the state of the art. Their disadvantage is that the flexible seal materials make the cleaning of the device more difficult, because the seal should not be damaged, if possible, and therefore no aggressive cleaning agents can be used.

SUMMARY OF THE INVENTION

Starting from the state of the art mentioned above, the object of the invention is to indicate an improved filling and/or emptying device and an improved method for filling and/or emptying flexible containers in which, on the one hand, the stringent limit values for the contamination of the environment can be met and which, at the same time, allow easier filling and/or emptying, both in terms of the mechanism and in terms of the method, the error rate thus being reducible and the throughput being increasable.

With respect to the method for filling and/or emptying flexible containers, said object is attained by the features as disclosed herein, i.e., in a method for filling and/or emptying flexible containers, by the following method steps:

Folding a container edge over a disposable fastening ring which is at least partially, preferably elastically, radially deformable, in particular from the radial inside to the radial outside.

Inserting, in particular manually inserting, the disposable fastening ring into an end portion of a filling and/or emptying neck of a filling and/or emptying device, the disposable fastening ring thus being arranged substantially concentrically with the filling and/or emptying neck and a radially outer fold-over section of the container edge being arranged and/or clamped between an inner surface of the filling and/or emptying neck and a radially outer surface of the disposable fastening ring;

Pressing, in particular mechanically pressing, the disposable fastening ring into a sealing section of the filling and/or emptying neck, sealing section being disposed downstream of the end portion in the axial direction and preferably having a smaller inner diameter than the end portion, the insertion and/or pressing of the disposable fastening ring into the inside of the filling and/or emptying neck thus leading to a radial deformation and to an opposite, preferably elastic, restoring force of the disposable fastening ring, said force pressing the outer fold-over section of the container edge against the inner surface of the filling and/or emptying neck and thereby sealing the container against the filling and/or emptying neck;

Filling or emptying the container by adding or discharging the substance through the filling and/or emptying neck;

Sealing and detaching the filled or emptied container; and sealing the fold-over section, the disposable fastening ring preferably being completely enclosed or encapsulated by the fold-over section.

Unless otherwise stated, the term "neck" as used hereinafter refers to the filling and/or emptying neck.

The method according to the invention has a plurality of advantageous effects. The first effect is that at the moment of or during the process of the filling or the emptying, the transition between the container and the neck is disposed inside the neck, which fundamentally reduces the possibility of the substance's escaping into the environment. At the same time, the use of the disposable fastening ring in interaction with the neck, in particular the sealing section of the neck, has the effect that a radially outer fold-over section of the container is pressed against the inner wall or inner surface of the neck and thereby seals the container against the neck in the area of the sealing section.

In other words, the person skilled in the art understands the interaction between the radially deformable disposable fastening ring and the sealing section of the filling and/or emptying neck to mean that a sealing of the container can be ensured by the method step of the pressing in.

Moreover, an overall simple process comprising few individual method steps is realized, the error rate and the opportunity for operator errors and therefore the risk of an unintended contamination of the environment thus being reduced overall. For example, an operator must only ensure that the container or the container edge is folded over the disposable fastening ring as described and that the disposable fastening ring together with a sufficient fold-over section is correctly inserted into the end portion of the neck. Subsequently, the operator must only ensure, for example by actuating a corresponding fully automatic or semi-automatic mechanism, that the disposable fastening ring is axially pressed into the sealing section of the neck and that an appropriate sealing of the container and an appropriate sealing of the disposable fastening ring are created after the filling or after the emptying of the container.

Another advantage of the invention is that the disposable fastening ring does not come into contact with the discharged or filled substance at any time if the disposable fastening ring is applied according to the method according to the invention. Accordingly, the risk of contaminating the substance by the disposable fastening ring is eliminated. At the same time, the invention achieves that the disposable fastening ring does not come into direct contact with the neck at any time during the method. Accordingly, a contamination of the neck by the disposable fastening ring is also excluded. Overall, the material and the purity of the disposable fastening ring can thus be selected significantly more freely and unbound, because the disposable fastening ring does not come into direct contact with either the substances or the neck.

In principle, the filling and/or emptying neck, or neck for short, can be any neck which establishes a connection to a filling device or a connection to an emptying device. In principle, various forms and designs of filling plants or filling devices and emptying plants or emptying devices are possible. In this context, the most important aspect is that the neck is connected or can be connected to the rest of the plant or device without any other potential leakage points, if possible, so that an accordingly sealed overall connection is achieved. Stainless steel can be used as the material, for example. Advantageously, the neck according to the present invention is designed in an extremely simple manner. It can be formed essentially from a simple pipe socket. Depending on the design of the disposable fastening ring, even an unchanged or minimally changed inner diameter may be required to perform the method. The simple design of the neck alone shows the enormous advantages of the method according to the invention, because highly complex coupling or transition structures to the rest of a filling or emptying device are used in parts of the state of the art, said coupling or transition structures being accordingly disadvantageous with respect to production, maintenance and operability.

The method step of inserting the disposable fastening ring into the end portion of the neck provided according to the invention of course provides that the container edge stays folded over the disposable fastening ring. Advantageously, the size or the length of a radially outer fold-over section of the container edge, i.e., the area of the container edge that is folded over the disposable fastening ring, which is disposed between the end portion of the neck and the disposable fastening ring, can additionally be selected in such a manner that said fold-over section cannot only be folded over the disposable fastening ring but also be led out of the end portion of the neck again and laid or rolled over an edge of the end portion of the neck.

According to the invention, the pressing in, in particular the mechanical pressing in, of the disposable fastening ring is to be carried out in such a manner that the container edge stays folded over the disposable fastening ring. Advantageously, the part of the radially outer fold-over section which is laid around the edge of the end portion can remain there during the pressing in of the disposable fastening ring, i.e., where possible, said fold-over section is not pulled into the inside of the neck over the edge of the end portion of the neck during the pressing of the disposable fastening ring into the sealing section.

The means for performing the pressing in, in particular the mechanical pressing in, are described in detail below, in particular with respect to the device according to the invention. When the disposable fastening ring is pressed in, a radial compression or a radial, preferably elastic, deformation of the ring is to be achieved by means of a corresponding opposite restoring or contact force, also in the radial direction, which supports or even creates the sealing between the neck and the container edge. To this end, the disposable fastening ring must, on the one hand, have a certain deformability but, on the other hand, also an appropriate stiffness, so that the disposable fastening ring can be pressed into the sealing section and be deformed in the process and a corresponding opposite restoring force supporting the sealing, in particular a clamping force on the radially outer fold-over section of the container edge, can be generated.

The filling or emptying of the container can be performed in a manner known per se. The same applies to the sealing and detachment of the filled or emptied container. To this end, double clips known per se can be used, for example. The sealing of the fold-over section, which encapsulates the disposable fastening ring can, also be achieved by clips known per se or other closure means.

A first advantageous variant of the invention can provide that, as a result of the insertion and/or pressing in of a subsequent disposable fastening ring, a disposable fastening ring already located, in particular sealed, in the sealing section of the neck is transferred into a removal section of the neck disposed axially downstream of the sealing section, the removal section preferably having a larger inner diameter compared to the sealing section. This method variant also has a plurality of advantageous effects.

First, the fact that the advantageously sealed or encapsulated disposable fastening ring initially remains in the sealing section ensures that the neck is closed or sealed against the outside world or against the environment after the detachment of the filled or emptied container. This means that the fact that the preferably encapsulated or enclosed disposable fastening ring remains in the sealing section prevents a contamination of the plant from outside, at least beyond the sealing section. At the same time, the advantageous method variant allows the enclosed or encapsulated disposable fastening ring, together with the fold-over section of the detached container preferably providing the encapsulation, to be automatically transferred into a removal position or at least into a position which allows a removal of the preferably encapsulated disposable fastening ring in the course of a filling process or emptying process of a subsequent container. In this way, the number of individual method steps is significantly reduced, because the initiation of a subsequent filling process or emptying process likewise effects or at least initiates the removal or discharge of the remnants of a preceding filling or emptying process remaining in the neck.

Another particularly preferred embodiment of the method can also provide that a disposable fastening ring located, in particular sealed, in the removal area of the neck is removed, in particular manually, through a discharge channel which is preferably disposed axially downstream of the removal area and which opens into the neck. The removal of an arrangement of the disposable fastening ring and the fold-over section remaining in the neck as a result of the filling or emptying of a preceding container can thus be realized in a particularly simple manner and can simultaneously be integrated into the process sequence of the filling or emptying of the subsequent container, an overall simple and compact process design thus being possible. In this context, it has proven to be particularly advantageous if the size of the inner diameter of the removal section is selected in such a manner that the disposable fastening ring continues to apply a clamping force, in the form of a restoring force in response to a deformation, to the neck so that the disposable fastening ring does not slip in the neck, in particular in the removal section of the neck, at all or at least not on its own; at the same time, however, the inner diameter is advantageously selected in such a manner that it allows a manual removal of the disposable fastening ring clamped or held in the removal section. The partial deformability or partial elasticity of the disposable fastening ring discussed above also plays a role in the removal of the disposable fastening ring through the discharge channel. Advantageously, the discharge channel is dimensioned or its dimensions are adapted to the properties of the disposable fastening ring in such a manner that the disposable fastening ring can be removed from the discharge channel or through the discharge channel with the disposable fastening ring deforming in a non-destructive manner.

Another particularly advantageous embodiment of the method according to the invention can provide that an, in particular additional, encapsulation of the disposable fastening ring and the fold-over section is created when the disposable fastening ring is removed. To this end, a basically known continuous pipe container or continuous liner can be used, which is suitably arranged on the discharge channel and is sealed or closed above and below the disposable fastening ring during the discharge or removal of the disposable fastening ring and is then detached. Advantageously, this has the effect that the remnants or residues of the substance which may still be on the fold-over section of a container can be safely shielded and disposed of.

Another particularly preferred embodiment of the method provides that the disposable fastening ring is axially held in the sealing section and/or is radially pressed against the sealing section, preferably by means of a tool which has also carried out the pressing into the sealing section. In this way, the complexity of the method and the complexity of the corresponding device, which will be described below, are further reduced. Apart from the, preferably manual, insertion of the disposable fastening ring together with the fold-over section into the end portion of the neck, the pressing in and holding of the disposable fastening ring by means of the same tool allows the entire method to be performed largely using the neck, which is required anyway, and a single additional device feature, namely the tool for pressing in and holding the fastening ring.

With respect to the filling and/or emptying device according to the invention for filling and/or emptying flexible containers, in particular bags, of, in particular hazardous, loose substances, preferably in powder form, the filling and/or emptying device comprising a filling and/or emptying neck having an open end portion, the object mentioned above is attained in that at least one deformable disposable fastening ring is provided, the disposable fastening ring being realized in such a manner in relation to the inner diameter of the filling and/or emptying neck that an insertion, in particular a manual insertion, of the disposable fastening ring into an end portion of the filling and/or emptying neck is enabled after folding a container edge over the fastening ring, preferably from the radial inside to the outside, the disposable fastening ring thus being arranged substantially concentrically with the filling and/or emptying neck and a radially outer fold-over section of the container edge being arranged and/or clamped between an inner surface of the filling and/or emptying neck and a radially outer surface of the disposable fastening ring and the disposable fastening ring additionally being realized in such a manner in relation to the inner diameter of the filling and/or emptying neck that the disposable fastening ring can be pressed, in particular mechanically pressed, into a sealing section of the filling and/or emptying neck which is disposed downstream of the end portion in the axial direction and which preferably has a smaller inner diameter than the end portion, the disposable fastening ring being at least partially, preferably elastically, deformable in the radial direction, the insertion and/or pressing into the inside of the filling and/or emptying neck thus leading to a radial deformation and an opposite contact force, in particular an elastic restoring force, which presses the outer fold-over section of the container edge against the inner surface of the filling and/or emptying neck and thereby seals the container against the filling and/or emptying neck.

In the broadest sense, the device according to the invention has the same advantages and effects as the method described above. For this reason, with respect to the device features, reference is made to the corresponding method steps and their effect, also with respect to the embodiments of the device described below. Conversely, reference is also to be made to the description of the device for the method steps and method features, where necessary.

Thus, a significant simplification and therefore a facilitation and an avoidance of improper operation and corresponding malfunctions is achieved both at a mechanical, objective level and at a method level or operation level by the device according to the invention, in particular by the adaptation of the disposable fastening ring to the inner diameter of the neck, in particular to the preferably variable inner diameters of the neck in the different areas or sections. At the same time, a particularly high level of sealing and therefore an extremely low level of contamination of the environment is effected in a very surprising manner despite the relatively simple method and the corresponding device for performing the method.

A first embodiment of the device according to the invention can provide that the filling and/or emptying neck has a removal section which is disposed axially downstream of the sealing section, the removal section preferably having a larger inner diameter compared to the sealing section, the removal section further preferably being realized in such a manner in relation to the sealing section that the insertion and/or pressing in of a subsequent disposable fastening ring transfers a disposable fastening ring located, in particular sealed, in the sealing section into a removal section.

As already indicated above, the arrangement of the sealing section and the removal section, particularly preferably the realization of an end portion, a sealing section and a subsequent removal section, has the effect that remnants remaining on the neck after a filling process or an emptying process, in particular the remnants of the disposable fastening ring and of the fold-over section, first ensure a sealing of the neck to the outside and are subsequently automatically transferred into a removal position or a removal section, which causes or at least initiates the removal from the neck, in the course of a subsequent emptying or filling process. The automatic transfer into the removal section of the neck initiated by the subsequent filling or emptying process thus ensures that a process step which would otherwise have to be performed separately is no longer necessary or is rather carried out automatically.

Another preferred embodiment of the device can provide the provision of a discharge channel which is preferably disposed axially downstream of the removal area and which opens into the filling and/or emptying neck and which is disposed in such a manner in relation to the removal section that a disposable fastening ring located, in particular sealed, in the removal section of the filling and/or emptying neck can be removed, in particular manually, through the discharge channel.

In this process, a continuous liner fixed to and/or disposed on the discharge channel can be used in order to allow access or entry to the inside of the neck on the one hand and to achieve the further encapsulation of the disposable fastening ring on the other hand. Alternatively or additionally, at least one glove access device can be provided on the neck, the glove access device allowing access to the inside of the neck via a glove otherwise sealed against the inside of the neck in order to handle the disposable fastening ring and/or the remaining container edge there. The handling can relate to the removal from the removal section and/or to a further encapsulation.

Preferably, the at least one glove access device is disposed at the same height as the discharge channel or between the discharge channel and the removal section in the axial direction. This allows easy access to said areas of the neck.

The glove access device can also be provided by a device which is separate from the neck. For example, the device according to the invention can be combined with an isolator or a comparable device which comprises a glove box or a similar glove access device. When the neck is suitably arranged in relation to the other device, access to the inside of the neck can be possible in order to remove a closed or sealed disposable fastening ring. In this case, a discharge unit of the separate device comprising the glove access device can preferably be used as the discharge channel.

Another advantageous embodiment of the device can provide that a tool for transferring the disposable fastening ring from the end portion into the sealing section of the neck is provided; for this purpose, the tool is axially displaceable from an open position into a sealing position in the axial direction. During the transfer of the disposable fastening ring, the fold-over section of the container is of course to be carried along or transferred as well. In principle, the tool can have different drives or mechanisms for the displacement between the open position and the sealing position. Examples are pneumatic drives. The tool can be designed in such a manner that a localized, partial or full contact with the disposable fastening ring is established. However, the design of the tool should in any case ensure that the disposable fastening can be transferred smoothly and without damage from the inserted position in the end portion of the neck into the sealing position in the sealing section of the neck. For example, the activation of the tool can be triggered by an operator via a corresponding safety activation unit to ensure that the tool is only activated if the disposable fastening ring together with the fold-over section of the container edge is correctly inserted into the end portion of the neck and if there is no risk of injury or other danger.

Another advantageous embodiment can provide that the tool has a contact section by means of which the disposable fastening ring is axially held in the sealing section and/or radially pressed against the sealing section in the sealing position of the tool. The contact section is preferably the part of the tool which causes or effects the transfer of the disposable fastening ring from the end portion of the neck into the sealing section of the neck. If an axial holding and/or a radial pressing of the disposable fastening ring is achieved by means of the contact section according to the advantageous embodiment, the overall design of the device and, at the same time, the performance of the method are further simplified and become more effective by said embodiment. After all, this ensures that one and the same tool, in particular the contact section of the tool, can be used not only to press in the disposable fastening ring, but also to achieve axial holding and, if applicable, additionally or alternatively radial pressing to further support the sealing between the container and the neck. To this end, the contact section of the tool can have appropriate spreader means or folding means in order to generate or to increase a radial force, for example. A radial expansion of the contact section of the tool extending in the axial direction can also help to ensure that the disposable fastening ring together with the fold-over section of the container edge is axially held in and/or radially pressed against the sealing section.

Another advantageous embodiment of the device can provide that the tool has a resting section which rests on an axial edge of the end portion of the filling and/or emptying neck in the sealing position of the tool. Such a resting section of the tool can additionally create another barrier between the neck and the container, in particular the container inside, and thereby further improve the sealed shielding of the container from the environment or the outside world in the course of the filling or emptying.

After all, as already described above, the radially outer fold-over section is not only pressed against the neck from inside, but is also led out of the neck and laid or rolled over an edge in the end portion of the neck. If the tool now reaches the sealing position, the resting section of the tool comes, at least indirectly, into contact with the edge of the end portion of the neck, which means that the resting section of the tool once again causes a clamping or pressing of the radially outer fold-over section against the neck in the area of the edge of the end portion. This effects another sealing between the neck and the container, namely in the area of the end portion of the neck, in addition to the sealing section located inside the neck.

Particularly preferably, sealing means can be provided in the area of the resting section of the tool and/or on an opposite surface of the neck, for example in the area of the edge of the neck, said sealing means causing a sealing between the neck and the container edge when the sealing position of the tool is reached and, if applicable, additionally create a clamping of the container edge, for example between the sealing means.

Another advantageous embodiment of the device can provide that the at least one disposable fastening ring is made of polymer material, in particular of polyamide or polyurethane. Such materials allow a largely free adjustment between deformable and/or elastic and rigid material properties, the required adaptation of the partial deformability of the disposable fastening ring thus being adaptable to the respective areas or sections of the neck and, if required, to the dimensions or properties of the discharge channel.

Another advantageous embodiment can provide that the disposable fastening ring has a cross section profile which has at least two connected legs which are disposed at an angle to one another. The design of the disposable fastening ring comprising a multi-leg structure, for example in the shape of a V or W, has the advantageous effect that the disposable fastening ring applies a suitable contact force to the radially outer fold-over section and to the sealing section of the neck from the inside to the outside on its own or in interaction with the tool. Likewise, material can be saved by such a cross section profile of the disposable fastening ring. Likewise, such a cross section profile can be useful in deforming the disposable fastening ring in a simple manner, for example also plastically, when it is removed from a discharge channel.

Furthermore, another particularly preferred embodiment of the device can provide that the disposable fastening ring has a surface profile on a radially outer surface, preferably on a radially outer leg. The profile can be realized in one piece with the remaining disposable fastening ring. The profile can lead to an improved sealing effect and to an improved holding effect and can thus ensure that the disposable fastening ring is held safely in the end portion, in the sealing section and/or in the removal section and realizes an excellent sealing between the neck and the container edge, in particular in the sealing section. For example, the disposable fastening ring can be realized as a one-piece injection-molded part, which allows a design comprising a cross section profile, particularly preferably in the form of a multi-leg profile, to be realized and a profile of the radially outer surface, preferably on a radially outer leg, to be realized at the same time.

Another advantageous embodiment can provide that the inner diameter of the end portion is 0.2% to 1.5% larger than the inner diameter of the sealing section. This can ensure, for example, that the disposable fastening ring, together with the container edge which is folded over, can be inserted into the end portion by hand and without particularly high force application. Moreover, the embodiment can have the effect that the reduction of the inner diameter towards the sealing section effects the corresponding radial deformation of the disposable fastening ring and accordingly causes a safe clamping of the disposable fastening ring and of the container edge in the sealing section. The reduction of the inner diameter by 0.2% to 1.5% can already be sufficient to make an accordingly high force for the axial displacement of the disposable fastening ring from the end portion into the sealing section necessary if the disposable fastening ring is designed accordingly, in particular if an appropriate material is selected for the disposable fastening ring. Accordingly, preferably a pneumatic tool can be used to press the disposable fastening ring into the sealing section.

Furthermore, another particularly preferred embodiment can provide that the inner diameter of the removal section is 0.2% to 1.5% larger than the inner diameter of the sealing section. This is a way to ensure that the disposable fastening ring can be removed from the removal section when the disposable fastening ring is transferred there, in particular together with the detached fold-over section; the removal is once more particularly preferably performed by hand. The transfer of the disposable fastening ring from the sealing section into the removal section is preferably carried out indirectly via a tool and directly via a subsequent disposable fastening ring together with a fold-over section. In this context, too, the expansion of the inner diameter from the sealing section into the removal section supports the transferability and the force required for the transfer into the removal section.

Another particularly advantageous embodiment of the device can also provide that the sealing section is formed by a bead which is preferably introduced from outside into the filling and/or emptying neck. The bead can preferably extend over the entire circumference of the neck. Alternatively, the bead can be formed in sections of the neck, the sections being distributed, preferably evenly and/or symmetrically, over the entire circumference. This means that the shape of the inner diameter of the neck preferably changed in the sealing section, in particular the reduction of the inner diameter in the area of the sealing section, is made possible or provided by a deformation of the neck introduced or impressed from outside. This means that a deformation process is performed on a cylindrical neck which is smooth on the outside and on the inside, for example, the deformation process leading to a tapering of the outer diameter in an axial area on the entire circumference or in sections of the circumference. For example, the deformation process can comprise pressure forces which act on the area from outside in a machine press, if applicable. The deformation of the outer surface and/or of the outer diameter has the effect that, if no resistance is provided inside the neck, the deformation also affects or has an impact on the inner side of the neck and the inner surface of the neck. Said deformation of the inner surface of the neck introduced from the outside can then cause the formation of the sealing section of the neck.

However, an alternative embodiment can also provide that the change of the inner diameter, in particular for the formation of the sealing section of the neck, is introduced or impressed from outside, but that, in contrast to the embodiment described above, this is not a one-time and permanent but a current and reversible process. To this end, an appropriate neck having a certain radial basic elasticity can be provided. On the outside of this neck, preferably in the area of the formation of the sealing section, a deformation means, for example an expandable, preferably inflatable, sleeve enclosing the neck in the circumferential direction can be provided, said sleeve applying a force to the neck by an expansion to the radial inside and reversibly deforming the neck in such a manner that the inner diameter is reduced. The pressing of the disposable fastening ring against the neck can thus be further improved. In particular, an individual pressing can be performed in order, for example, to compensate for tolerances of the disposable fastening rings or for differences resulting from the folding or rolling of the container edge over the disposable fastening ring.

Preferably, a static permanent deformation of the inner diameter can also be combined with a dynamic reversible deformation.

BRIEF DESCRIPTION OF THE DRAWINGS

Further advantages, features and details of the invention are apparent from the following descriptions of preferred exemplary embodiments and from the drawings.

In the drawings.

DETAILED DESCRIPTION

Figure 1:
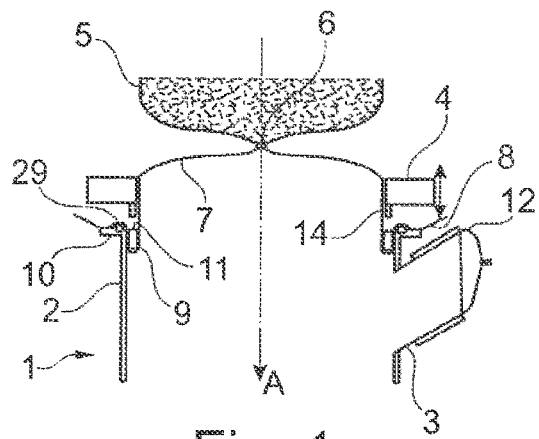
FIG. 1 shows a schematic illustration of a section through the device according to the invention in a first method state.

FIG. 1 shows a filling and/or emptying device 1 which is to be referred to as device 1 below. The essential components of device 1 comprise filling and/or emptying neck 2 which is to be referred as neck 2 for short below. Furthermore, the device comprises a discharge channel 3 which is disposed on the side and a tool 4 which is displaceable in axial direction A and which is axially adjustable between an open position and a sealing position. In the illustration of FIG. 1, tool 4 is being displaced in the direction of neck 2 and is thus transferred from an open position into a sealing position which is reached in the situation of FIG. 2 and which will be described in more detail below.

FIG. 1 also shows a filled container 5 which is closed by means of a closure 6 in the method stage of FIG. 1. However, a container edge 7 disposed beyond closure 6 is folded over a disposable fastening ring 9 from the radial inside to the radial outside in a fold-over section 8, and radially outer fold-over section 8 passes over edge 10 of neck 2 on the radially outer side of disposable fastening ring 9.

In the illustration of FIG. 1, disposable fastening ring 9 is inserted into an end portion 11 of neck 2.

A continuous container or continuous liner 12 which is used to discharge container remnants and/or disposable fastening rings is disposed on discharge channel 3 disposed on the side.

Figure 2:
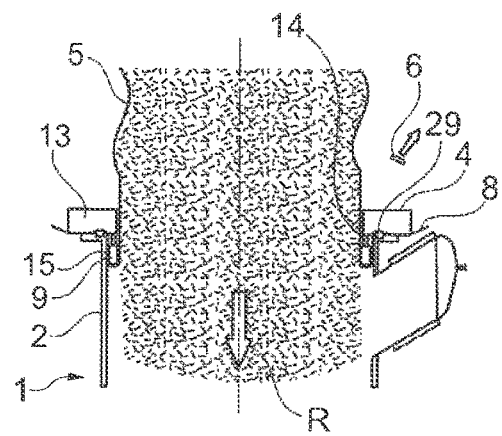
FIG. 2 shows a schematic illustration of a section through a device according to the invention in a second method situation of the method according to the invention.

In the method stage of FIG. 2, tool 4 has been transferred into a sealing position. In the sealing position, a resting section 13 of tool 4 rests on axial edge 10 of end portion 11 of the neck and clamps the radially outer fold-over section 8 of container edge 7 between the tool, in particular between resting section 13, and the edge of end portion 11 of neck 2 in said edge portion. In this process, a seal 29 which is additionally disposed on edge 10 can be used as a sealing means, seal 29 improving the sealing between neck 2 or edge 10 and fold-over section 8 of container edge 7 in the sealing position of tool 4. Moreover, disposable fastening ring 9 together with fold-over section 8 of container edge 7 has been pressed into a sealing section 15 of the neck by means of a contact section 14 of tool 4 in the sealing position of tool 4. Preferably, the inner diameter in sealing section 15 of neck 2 can be smaller than in end portion 11, for example, the pressing of disposable fastening ring 9 by means of contact section 14 of tool 4 thus leading to the fact that disposable fastening ring 9 is radially deformed and applies an opposite, in particular elastic, contact force to fold-over section 8 of container edge 7, preferably at the same time, and thus seals container edge 7 against neck 2.

If a shape of disposable fastening ring 9 is selected advantageously, however, said sealing can be achieved without a narrowing in the inner diameter of the neck, i.e., also without a reduction of the inner diameter in the area of sealing section 15. To this end, exclusively a deformation, in particular a radial compression, of disposable fastening ring 9 can be provided, for example. Particularly preferably, however, a suitable reduction of the inner diameter can improve both the axial holding of disposable fastening ring 9 in sealing section 15 and the radial pressing of fold-over section 8 against neck 2.

So FIG. 2 shows that a double seal between neck 2 and container edge 7 is created. On the one side by the clamping of disposable fastening ring 9 in the sealing section of neck 2 and on the other side by resting section 13 of tool 4 on edge 10 of neck 2, in particular in end portion 11 of neck 2. If there is such an advantageous seal, closure 6 can be detached from the container without any problems and container 5 can be emptied, as shown by direction arrow R.

Following the emptying of container 5 shown in FIG. 2, a detachment of container 5 from container edge 7 can be achieved with container 5 being closed on both sides, in particular using a double clip. First, container 5 can be separated from container edge 7 and both ends can be sealed by means of a double clip comprising clips 16.1 and 16.2. In a second sealing step using a single clip 16.3, for example, radially outer fold-over section 8 previously held on edge 10 of neck 2 by means of resting section 13 can be folded over to the inside, in particular after the transfer of tool 4 from the sealing position into an open position shown in FIG. 3, for example. The double sealing of container edge 7 thus has the effect that disposable fastening ring 9 which is still located in sealing section 15 of the neck is completely encapsulated by detached container edge 7.

Sealed and detached container 5 can now be disposed of in a simple and safe manner and without contaminating the environment. With respect to container edge 7 and disposable fastening ring 9 enclosed or encapsulated therein, reference is made to the illustration of following FIGS. 4 to 7.

In the following illustration of FIG. 4, a corresponding container edge 7 of another container 5, for example in the form of a big bag, is folded over another disposable fastening ring 9 from the radial inside to the radial outside in a closed state, wherein, once again, the radially outer area of fold-over section 8 is guided or rolled over edge 10 of neck 2 in end portion 11. In this state, the second or following disposable fastening ring 9 is introduced, in particular inserted, into end portion 11 of neck 2.

Figure 4:
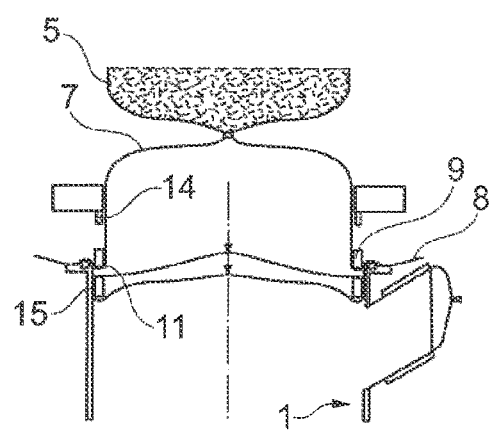
FIG. 4 shows a schematic section through a device according to the invention in another method step of the method according to the invention.

By analogy with FIGS. 1 and 2, tool 4 in FIG. 5 is now transferred from the open position shown in FIG. 4 into the sealing position shown in FIG. 5, wherein, once again, contact section 14 or contact sections 14 of tool 4 transfer disposable fastening ring 9, in this case the following or second disposable fastening ring 9, from end portion 11 of neck 2 into sealing section 15 of neck 2. In this way, another sealing, in particular a double sealing, of container edge 7 against neck 2 is realized, a safe emptying of container 5 thus being ensured. However, the second seal within edge 10 of neck 2 may also be omitted by using the disposable fastening ring, which provides an equally reliable sealing.

Figure 5:
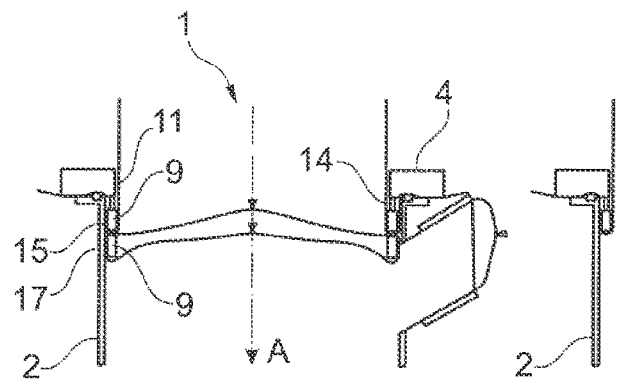
FIG. 5 shows a schematic section through a device according to the invention in another method step of the method according to the invention.

FIG. 5 also shows that the pressing of second disposable fastening ring 9 into sealing section 15 has the effect that the first or preceding disposable fastening ring 9 is displaced further in the axial direction and is thus transferred into a removal section 17 of neck 2 indirectly by means of tool 4 and directly via following disposable fastening ring 9. Preferably, the inner diameter of neck 2 in removal section 17 is slightly larger than in sealing section 15.

Figure 6:
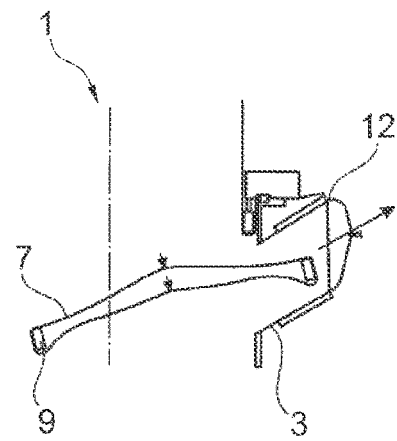
FIG. 6 shows a schematic section through a device according to the invention in another method step of the method according to the invention.

As indicated in FIG. 6, for example, disposable fastening ring 9 of the preceding container unloading process or container emptying process together with container edge 7 remaining around disposable fastening ring 9 can be removed through a discharge channel 3 disposed on the side downstream of removal section 17 of neck 2 in the axial direction and can once again be enclosed or encapsulated by means of continuous liner 12. Disposable fastening ring 9 of the preceding emptying can be remove by manually accessing discharge channel 3, for example, wherein continuous liner 12 already provides protection of the user against manual contact with disposable fastening ring 9 and container edge 7. The removal of disposable fastening ring 9 together with container edge 7 from discharge channel 3 shown in FIG. 6 is preferably performed before or during the opening and/or emptying of following container 5, as already shown in FIG. 2.

Figure 7:
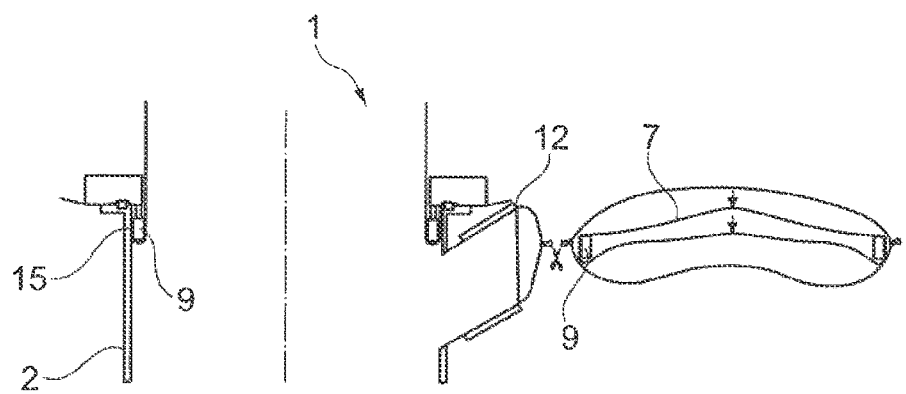
FIG. 7 shows a schematic section through a device according to the invention in another method step of the method according to the invention.

Finally, FIG. 7 shows how first disposable fastening ring 9 together with corresponding container edge 7 is covered or encapsulated again and separated from continuous liner 12, advantageously by using a double clip 16.1, 16.2 again. In this method stage, second or following disposable fastening ring 9 is still located in sealing section 15 of neck 2. After the emptying of following container 5, i.e., following the method step of FIG. 7, the method can be continued by repeatedly performing the method steps according to FIGS. 3 to 7 in order to detach container 5 and to unload a following container 5.

The preceding description of the device and of the corresponding method of the present invention shows that the method and the device can be realized and carried out in a very simple manner, but that they simultaneously allow/cause a particularly high level of purity or, conversely, a particularly low level of contamination of the environment. By comparison, devices and methods which use inflatable seals or otherwise adjustable or modifiable seals in order to seal the container edge, for example, are highly complex and the associated methods are equally complex.

The simple method and the simple design of the device, as described in the preceding FIGS. 1 to 7, significantly reduce the error rate and of the error probability. Furthermore, the simple design of the device allows a very easy cleaning of the device. The basically insensitive surfaces of neck 2, which can be made of stainless steel, for example, allow the use of a very large or unlimited number of cleaning agents, which is also not possible in generic devices which have an accordingly complex structure.

Figure 3:
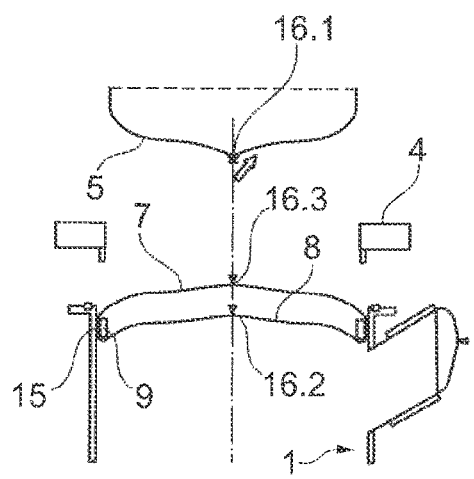
FIG. 3 shows a schematic section through a device according to the invention in another method step of the method according to the invention.

As shown in FIG. 3 and FIG. 4, for example, container edge 7, after its detachment from container 5, forms a double-walled sealing of neck 2, in particular beyond end portion 11 in interaction with disposable fastening ring 9 and its clamping in sealing section 15 of neck 2. Conversely, however, this also means that neck 2, apart from a possible first connection to a container 5 or container edge 7, is continuously closed and sealed, so that no impurities can penetrate into the inside of neck 2, especially between the filling processes or emptying processes. Likewise, no material or substance residues, in particular powder residues, can escape from the inside of neck 2 into the environment. Surprisingly, the double-walled sealing on the basis of container edge 7 after the detachment from container 5 is of such a stable nature that an overpressure can even be maintained inside neck 2. For example, up to 0.5 bar of overpressure can be generated and maintained without any noticeable escape of the overpressure from neck 2.

Another particularly advantageous aspect of the device and of the method according to FIGS. 1 to 7 is that the connection between containers 5 and device 1, in particular neck 2, can be established in a particularly fast and simple manner. This also benefits the overall process time for filling and/or emptying containers.

In FIGS. 1 to 7, the device and the method have been described in the form of an emptying. However, the identical device features and largely identical method steps can also be used when a filling process is to be performed. To this end, the device is simply to be rotated by 180°, for example if the substance or the powder is to be filled into container 5 by gravity. Another difference is, of course, that the transition between container 5 and container edge 7 is not initially closed by means of a closure 6, but is rather open and is detached from container edge 7 and sealed on both sides only after container 5 has been filled. If applicable, the device can also be used both for filling processes and for emptying processes, which is also facilitated by the simple structure.

Figure 8:
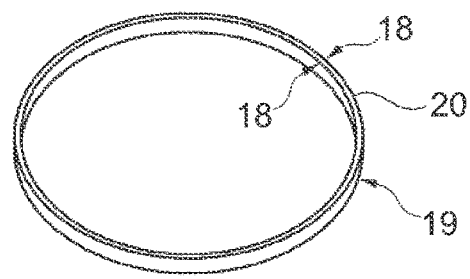
FIG. 8 shows a schematic illustration of a disposable fastening ring according to a first embodiment.

FIG. 8 shows a schematized illustration of a disposable fastening ring 9. This disposable fastening ring 9 has two legs 18 which are connected to one another at an angle, in particular at an acute angle. For example, disposable fastening ring 9 can be made of polymer material, in particular polyamide or polyurethane. Disposable fastening ring 9 has a surface profile 20 on a radially outer surface 19, in particular on radially outer leg 18, surface profile 20 further improving the sealing effect of disposable fastening ring 9.

Figure 9:
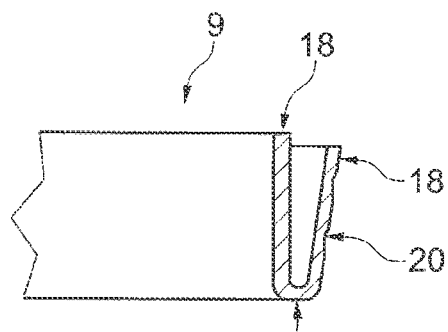
FIG. 9 shows a section through a disposable fastening ring according to the illustration of FIG. 8.

The design of disposable fastening ring 9 is also shown in the sectional view of FIG. 9. This figure shows that the two legs 18 substantially form a U-shape comprising a corresponding transition area 19. Radially outer leg 18 has profile 20 on the radial outside.

Figure 10:
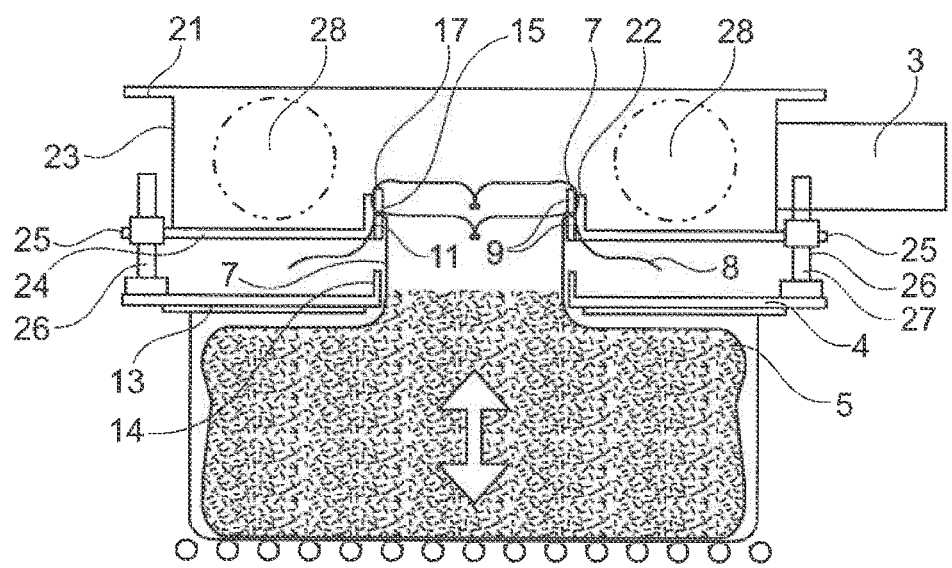
FIG. 10 shows a schematic illustration of a device according to the invention in a second embodiment.

FIG. 10 shows an alternative embodiment of the device which can be used, for example, to connect the device to an isolator, for example, and thus to empty the containers into the isolator or fill them from the isolator. In the example of FIG. 10, a variant is shown in which device 1 can be arranged below an isolator. To this end, the device has a neck 2 which is provided with a connection means 21 realized as a flange at an axial end in order to establish a sealed connection to the isolator (not shown). Connection means 21 can have an additional seal in order to allow a sealed connection to an isolator or to a comparable device.

Neck 2 deviates from the schematic illustration of FIG. 1 to FIG. 7 in that end portion 11, sealing section 15 and removal section 17 are disposed in an inner neck section 22, wherein inner neck section 22 extends in an outer neck section 23 and coaxially to said outer neck section 23 and is connected to outer neck section 23 via a closure plate 24, in particular by a substance bond. Inner neck section 22 thus has a reduced cross section or inner diameter compared to the outer neck section.

Discharge channel 3, however, is disposed in the outer neck section or is connected to neck 2, which allows an easier handling of the disposable fastening rings to be discharged, because more space is available for their handling. The functioning of device 1, in particular the function or the interaction of container 5, disposable fastening ring 9 and neck 2, is otherwise identical to the embodiment of FIG. 1 to FIG. 7. For example, it can be seen that a disposable fastening ring 9 located in sealing section 15 together with the detached container edge ensures a double-walled sealing of the neck, also because the disposable fastening ring ensures a pressing of the container or the container edge against the neck in sealing section 15.

A projection 25 which is used for the support and/or passing of a guide 26 of tool 4 is provided on at least part of closure plate 24. For example, the guide is disposed on two diametrically opposite sides of neck 2 and has one rod 27 or several rods 27 on each side. Guide 26 of tool 4 can itself be connected to a drive which is not shown in the drawing of FIG. 10. However, guide 26 and the drive can also be used without passing through or being supported in projection(s) 25. For example, the drive or the drives can be disposed on or fixed to the side of neck 2, in particular on an outer surface. Guide (s) 26 and/or the drive(s) can also be used in the embodiment of FIG. 1 to FIG. 7.

Tool 4 is displaced between the open position and the sealing position via the drive and guide 26. In FIG. 10, tool 4 is disposed in an open position. As already described in FIG. 1 to FIG. 7, contact section 14 of tool 4 can effect the transfer of disposable fastening rings 9 from end portion 11 of neck 2 in inner neck section 22 into sealing section 15 directly and the transfer of disposable fastening rings 9 from sealing section 15 into removal section 17 indirectly via another disposable fastening ring 9 by transferring tool 4 from the open position into the sealing position. When the sealing position is reached, resting section 13 of tool 4 rests on edge 10, in particular also on closure plate 24 of neck 2, and can seal container edge 7 in addition to its sealing in sealing section 15 of neck 2 in the area of the closure plate by means of a sealing device (not shown in detail).

The example of FIG. 10 also shows that two glove access devices 28 are provided approximately at the height of discharge channel 3 in the axial direction; the two glove access devices 28 allow manual access protected from outside to the inside of neck 2, for example in order to remove a disposable fastening ring 9 located in removal section 17.

A support device which can receive and support the containers to be filled or to be emptied can be provided below the device according to FIG. 10 or above device 1 according to FIG. 1 to FIG. 7. The support device can be designed as a cage, for example as a bar cage.

As an alternative to the embodiment of FIG. 10, a device which essentially corresponds to the illustration of FIG. 1 to FIG. 7 can also be combined with another device which provides the glove access device and/or the discharge channel in this case. An isolator can be used as such a device, for example. The combined device is also part of the subject matter of the invention.

REFERENCE SIGNS 1 filling and/or emptying device
2 filling and/or emptying neck
3 discharge channel
4 tool
5 container
6 closure
7 container edge
8 fold-over section
9 disposable fastening ring
10 edge of the neck
11 end portion of the neck
12 continuous container/continuous liner
13 resting section
14 contact section of the tool
15 sealing section of the neck
16.1 double clip
16.2 double clip
16.3 single clip
17 removal section of the neck
18 leg
19 transition area
20 surface profile
21 connection means
22 inner neck section
23 outer neck section
24 closure plate
25 projection
26 guide
27 rod/rods
28 glove access device
29 seal
A axial direction
R direction arrow

The invention claimed is:

1. A method for filling and/or emptying flexible containers (5) of loose substances, the method comprising the steps of:
folding a container edge (7) over a radially deformable, disposable fastening ring (9);
inserting the disposable fastening ring (9) into an end portion of a filling and/or emptying neck (2) of a filling and/or emptying device (1), the disposable fastening ring (9) thus being arranged substantially concentrically with the filling and/or emptying neck (2) and a radially outer fold-over section (8) of the container edge (7) being arranged and/or clamped between an inner surface of the filling and/or emptying neck (2) and a radially outer surface;
pressing the disposable fastening ring (9) into a sealing section (15) of the filling and/or emptying neck (2) disposed downstream of the end portion in the axial direction (A) a radially outer fold-over section (8) of the container (5) being pressed against the sealing section (15) of the filling and/or emptying neck (2) and thereby sealing the container (5) against the filling and/or emptying neck (2) in the area of the sealing section (15), the insertion and/or pressing of the disposable fastening ring (9) into the inside of the filling and/or emptying neck (2) thus leading to a radial deformation and to an opposite contact force which presses the outer fold-over section (8) of the container edge (7) against the inner surface of the filling and/or emptying neck (2) and seals the container (5) against the filling and/or emptying neck (2) in the process;

filling or emptying the container (5) by adding or discharging the substance through the filling and/or emptying neck (2);

sealing and detaching the filled or emptied container (5); sealing the fold-over section, the disposable fastening ring (9) being enclosed by the fold-over section.

2. The method according to claim 1, wherein, as a result of the insertion and/or pressing in of a subsequent disposable fastening ring (9), a disposable fastening ring (9) located in the sealing section (15) is transferred into a removal section (17) of the filling and/or emptying neck (2), the removal section (17) being disposed axially downstream of the sealing section (15).

3. The method according to claim 2, wherein a disposable fastening ring (9) located in the removal section (17) of the filling or emptying neck (2) is removed through a discharge channel (3).

4. The method according to claim 2, wherein an encapsulation of the disposable fastening ring (9) and the fold-over section (8) is created when the disposable fastening ring (9) is removed.

5. The method according to claim 1, wherein the disposable fastening ring (9) is axially held in the sealing section (15) and/or is radially pressed against the sealing section (15).

6. The method according to claim 1, wherein the containers are bags of hazardous loose substances in powder form.

7. The method according to claim 2, wherein the discharge channel (3) is disposed axially downstream of the removal section (17) and which opens into the filling and/or emptying neck (2).

8. A filling and/or emptying device (1) for filling and/or emptying flexible containers (5) of, loose substances the filling and/or emptying device (1) comprising a filling and/or emptying neck (2) having an open end portion and at least one deformable disposable fastening ring (9), the disposable fastening ring (9) being realized in such a manner in relation to the inner diameter of the filling and/or emptying neck (2) that an insertion of the disposable fastening ring (9) into an end portion of the filling and/or emptying neck (2) is enabled after a container edge (7) has been folded over the fastening ring, the disposable fastening ring (9) thus being arranged substantially concentrically with the filling and/or emptying neck (2) and a radially outer fold-over section (8) of the container edge (7) being arranged and/or clamped between an inner surface of the filling and/or emptying neck (2) and a radially outer surface and the disposable fastening ring (9) being additionally realized in such a manner in relation to the inner diameter of the filling and/or emptying neck (2) that the disposable fastening ring (9) can be pressed into a sealing section of the filling and/or emptying neck (2) which is disposed downstream of the end portion in the axial direction (A), the disposable fastening ring (9) being deformable in the radial direction, the insertion and/or pressing into the inside of the filling and/or emptying neck (2) thus leading to a radial deformation and an opposite contact force which presses the outer fold-over section (8) of the container edge (7) against the inner surface of the filling and/or emptying neck (2) and seals the container (5) against the filling and/or emptying neck (2) in the process.

9. The filling and/or emptying device (1) according to claim 8, wherein the filling and/or emptying neck (2) has a removal section (17) which is disposed axially downstream of the sealing section (15), the removal section (17) having a larger inner diameter compared to the sealing section (15), the removal section (17) further being realized in such a manner in relation to the sealing section (15) that the insertion and/or pressing in of a subsequent disposable fastening ring (9) transfers a disposable fastening ring (9) located in the sealing section (15) into a removal section (17).

10. The filling and/or emptying device (1) according to claim 8, further comprising a discharge channel (3) which is disposed axially downstream of the removal section (17) and which opens into the filling and/or emptying neck (2) and which is disposed in such a manner in relation to the removal section (17) that a disposable fastening ring (9) located in the removal section (17) of the filling and/or emptying neck (2) can be removed through the discharge channel (3).

11. The filling and/or emptying device (1) according to claim 8, further comprising a tool (4) for transferring the disposable fastening ring (9) from the end portion into the sealing section (15), for which purpose the tool (4) is axially displaceable from an open position into a sealing position in the axial direction (A).

12. The filling and/or emptying device (1) according to claim 8, wherein the tool (4) has a contact section (14) by means of which the disposable fastening ring (9) is axially held in the sealing section (15) and/or radially pressed against the sealing section (15) in the sealing position of the tool (4).

13. The filling and/or emptying device (1) according to claim 8, wherein the tool (4) has a resting section (13) which rests on an axial edge (10) of the end portion of the filling and/or emptying neck (2) in the sealing position of the tool (4).

14. The filling and/or emptying device (1) according to claim 8, wherein the disposable fastening ring (9) is made of polymer material.

15. The filling and/or emptying device (1) according to claim 8, wherein the disposable fastening ring (9) has a cross section profile which has at least two legs (18) which are connected to one another at an angle.

16. The filling and/or emptying device (1) according to claim 8, wherein the disposable fastening ring (9) has a surface profile (20) on a radially outer surface.

17. The filling and/or emptying device (1) according to claim 8, wherein the inner diameter of the end portion is 0.2% to 1.5% larger than the inner diameter of the sealing section (15).

18. The filling and/or emptying device (1) according to claim 8, wherein the inner diameter of the removal section (17) is 0.2% to 1.5% larger than the inner diameter of the sealing section (15).

19. The filling and/or emptying device (1) according to claim 8, wherein the sealing section (15) is realized by a bead which is introduced from outside into the filling and/or emptying neck (2).

20. The filling and/or emptying device (1) according to claim 8, wherein the filling and/or emptying neck (2) has a smaller inner diameter than the end portion.

* * * * *